US010673726B2

(12) United States Patent
Peng et al.

(10) Patent No.: US 10,673,726 B2
(45) Date of Patent: Jun. 2, 2020

(54) HEARTBEAT PACKET TIMER IDENTIFICATION METHOD, AND DEVICE (71) Applicant: Huawei Technologies Co., Ltd., Shenzhen (CN)

(72) Inventors: Yu Peng, Shanghai (CN); Youzhen Chen, Shanghai (CN); Song Yang, Shanghai (CN); Yuhua Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 15/532,422

(22) PCT Filed: Dec. 1, 2014

(86) PCT No.: PCT/CN2014/092714
§ 371 (c)(1),
(2) Date: Jun. 1, 2017

(87) PCT Pub. No.: WO2016/086345
PCT Pub. Date: Jun. 9, 2016

(65) Prior Publication Data
US 2017/0272347 A1 Sep. 21, 2017

(51) Int. Cl.
*H04L 12/26* (2006.01)
*H04J 3/14* (2006.01)
(Continued)

(52) U.S. Cl.
CPC ............. *H04L 43/103* (2013.01); *H04J 3/14* (2013.01); *H04L 43/0811* (2013.01);
(Continued)

(58) Field of Classification Search
None
See application file for complete search history.

(56) References Cited

U.S. PATENT DOCUMENTS

2003/0014517 A1* 1/2003 Lindsay ................. G06F 1/263
709/224
2009/0217291 A1* 8/2009 Errickson ........... G06F 11/0727
719/313
(Continued)

FOREIGN PATENT DOCUMENTS

CN 102340862 A 2/2012
CN 103051635 A 4/2013
(Continued)

OTHER PUBLICATIONS

Machine Translation and Abstract of Chinese Publication No. CN102340862, Feb. 1, 2012, 23 pages.
Machine Translation and Abstract of Chinese Publication No. CN103684911, Mar. 26, 2014, 14 pages.
Foreign Communication From a Counterpart Application, PCT Application No. PCT/CN2014/092714, English Translation of International Search Report dated Sep. 7, 2015, 2 pages.
(Continued)

*Primary Examiner* — Saba Tsegaye
(74) *Attorney, Agent, or Firm* — Conley Rose, P.C.

(57) ABSTRACT

A heartbeat packet timer identification method and a device, where the identification method is performed by a device that sets a timer, and the method includes determining, in a data packet transmitted by the device, each associated data packet corresponding to each timing end moment of the timer and determining, according to each associated data packet and each timing end moment of the timer, whether the timer is a heartbeat packet timer set by the device for transmitting a heartbeat packet. With reference to a data packet transmitted by a device and each associated data packet that corresponds to each timing end moment of a timer, the heartbeat packet timer identification method and the device may determine with relatively high accuracy whether the timer is a heartbeat packet timer.

19 Claims, 4 Drawing Sheets (51) Int. Cl.
*H04M 7/00* (2006.01)
*H04J 3/06* (2006.01)

(52) U.S. Cl.
CPC .......... *H04L 43/10* (2013.01); *H04M 7/0084* (2013.01); *H04J 3/0661* (2013.01)

(56) References Cited

U.S. PATENT DOCUMENTS

| | | | |
|---|---|---|---|
| 2009/0285213 A1* | 11/2009 | Chen | H04W 40/28 370/392 |
| 2010/0293200 A1* | 11/2010 | Assarpour | H04L 45/00 707/802 |
| 2014/0020119 A1* | 1/2014 | Zollinger | H04L 43/0882 726/30 |
| 2014/0112318 A1 | 4/2014 | Zhou et al. | |
| 2016/0050134 A1 | 2/2016 | Liu et al. | |

FOREIGN PATENT DOCUMENTS

| | | |
|---|---|---|
| CN | 103684911 A | 3/2014 |
| CN | 104093199 A | 10/2014 |
| CN | 104135571 A | 11/2014 |
| WO | 2013075436 A1 | 5/2013 |

OTHER PUBLICATIONS

Foreign Communication From a Counterpart Application, PCT Application No. PCT/CN2014/092714, English Translation of Written Opinion dated Sep. 7, 2015, 5 pages.

Machine Translation and Abstract of Chinese Publication No. CN103051635, Apr. 17, 2013, 11 pages.

Foreign Communication From a Counterpart Application, Chinese Application No. 201480070440.2, Chinese Office Action dated Nov. 2, 2018, 5 pages.

* cited by examiner

HEARTBEAT PACKET TIMER IDENTIFICATION METHOD, AND DEVICE

CROSS-REFERENCE TO RELATED APPLICATION

This application is a U.S. National Stage of International Patent Application No. PCT/CN2014/092714 filed on Dec. 1, 2014, which is hereby incorporated by reference in its entirety.

TECHNICAL FIELD

Embodiments of the present disclosure relate to the field of communications technologies, and in particular, to a heartbeat packet timer identification method, and a device.

BACKGROUND

To keep a persistent connection link between a client and a server normal, a device on which the client resides sets some timers for periodical timing. Each time a timing end moment set by the timer arrives, the device sends a heartbeat packet to the server, and initiates heartbeat packet interaction with the server in order to determine that the persistent connection link between the client and the server is normal. These timers used to time the device when the device sends the heartbeat packet are heartbeat packet timers. When a timing end moment of a heartbeat packet timer comes, even if the device is in a standby state, the device is awakened. As there are increasingly more clients (which may also be applications or processes running in the device) that have different functions on the device, heartbeat packet timers set by the device also continuously increase. As a result, the device is frequently awakened, greatly affecting standby power consumption of the device.

To reduce the standby power consumption of the device, the heartbeat packet timer may be turned off in some scenarios, or duration of a timing period of the heartbeat packet timer is increased. Because a relatively large quantity of timers are set by the device, the heartbeat packet timer needs to be accurately identified. However, in some other approaches, a quantity of arrival times of a timing end moment of a timer is generally counted in a period of time. When the quantity of times exceeds a preset value, it is determined that the timer is a heartbeat packet timer. It is conceivable that, some timers set by the device may repeatedly perform timing only for implementing a particular function of the device, and these timers are not heartbeat packet timers. Therefore, when the other approaches identify whether a timer is a heartbeat packet timer, an identification error easily occurs, affecting working performance of the device.

SUMMARY

Embodiments of the present disclosure provide a heartbeat packet timer identification method and a device in order to improve accuracy of identifying a heartbeat packet timer by a device.

According to a first aspect, an embodiment of the present disclosure provides a heartbeat packet timer identification method. The identification method is performed by a device that sets a timer, and includes determining, in a data packet transmitted by the device, each associated data packet corresponding to each timing end moment of the timer, where an association relationship exists between the associated data packet and the timer, and the data packet transmitted by the device is a data packet sent by the device, or a data packet received by the device, or a data packet sent by the device and a data packet received by the device, and determining, according to each associated data packet and each timing end moment of the timer, whether the timer is a heartbeat packet timer set by the device for transmitting a heartbeat packet.

With reference to the first aspect, in a first implementation manner, determining an associated data packet corresponding to each of timing end moments of the timer includes learning at least one data packet and a socket of the at least one data packet that are transmitted by the device in a period of time corresponding to a current timing end moment of the timer, determining, according to the socket of the at least one data packet, at least one candidate associated data packet corresponding to the current timing end moment in the at least one data packet, and determining, according to the current timing end moment and a processing moment of the at least one candidate associated data packet corresponding to the current timing end moment, an associated data packet corresponding to the current timing end moment, where the associated data packet corresponding to the current timing end moment is a candidate associated data packet, having a minimum difference between a processing moment and the current timing end moment, of the candidate associated data packets corresponding to the current timing end moment, and the processing moment of the candidate associated data packet is a receiving moment for receiving the candidate associated data packet by the device if the candidate associated data packet is a data packet received by the device, or the processing moment of the candidate associated data packet is a sending moment for sending the candidate associated data packet by the device if the candidate associated data packet is a data packet sent by the device.

With reference to the first implementation manner of the first aspect, in a second implementation manner, determining, according to each associated data packet and each timing end moment of the timer, whether the timer is a heartbeat packet timer set by the device for transmitting a heartbeat packet includes obtaining, according to the current timing end moment and the processing moment of the associated data packet corresponding to the current timing end moment, a pheromone addition amount corresponding to the current timing end moment, determining a pheromone surplus amount according to the pheromone addition amount corresponding to the current timing end moment and each pheromone addition amount corresponding to each timing end moment before the current timing end moment, and determining, according to the pheromone surplus amount, whether the timer is the heartbeat packet timer set by the device for transmitting a heartbeat packet.

With reference to the second implementation manner of the first aspect, in a third implementation manner, determining, according to the pheromone surplus amount, whether the timer is the heartbeat packet timer set by the device for transmitting a heartbeat packet includes determining that the timer is the heartbeat packet timer if the pheromone surplus amount is greater than a first preset value, determining that the timer is not the heartbeat packet timer if the pheromone surplus amount is less than a second preset value, or if the pheromone surplus amount is less than the first preset value and is greater than the second preset value, and when a next timing end moment comes, setting the next timing end moment as a new current timing end moment, and returning to perform the learning at least one data packet and a socket of the at least one data packet that are transmitted by the device in a period of time corresponding to a current timing end moment of the timer.

With reference to the third implementation manner of the first aspect, in a fourth implementation manner, a pheromone addition amount corresponding to any one of the timing end moments of the timer is determined according to:

$$add_i = \begin{cases} 1 - delta_i/\text{timeout}, & delta_i < \text{timeout} \\ -\text{THRESHOLD}/4, & delta_i \geq \text{timeout} \end{cases};$$

and the pheromone surplus amount surplus is determined according to:

$$\text{surplus} = \sum_{i=1}^{N} add_i + \text{extra}.$$

where both i and N are positive integers, a value of i is a sequence number of each timing end moment before the current timing end moment, and a value of N is a sequence number of the current timing end moment, $add_i$ is a pheromone addition amount corresponding to an $i^{th}$ timing end moment, $delta_i$ is an offset between the $i^{th}$ timing end moment and a processing moment of an associated data packet corresponding to the $i^{th}$ timing end moment, where $delta_i = |whenElapsed_i - netElapsed_i|$, $whenElapsed_i$ is the $i^{th}$ timing end moment, and $netElapsed_i$ is the processing moment of the associated data packet corresponding to the $i^{th}$ timing end moment, timeout is used to represent a maximum tolerable offset, extra is an estimated pheromone addition amount, THRESHOLD is the first preset value, and −THRESHOLD is the second preset value.

According to a second aspect, an embodiment of the present disclosure provides a device. The device sets a timer, and the device includes a determining module configured to determine, in a data packet transmitted by the device, each associated data packet corresponding to each timing end moment of the timer, where an association relationship exists between the associated data packet and the timer, and the data packet transmitted by the device is a data packet sent by the device, a data packet received by the device, or a data packet sent by the device and a data packet received by the device, and a judging module configured to determine, according to each associated data packet and each timing end moment of the timer, whether the timer is a heartbeat packet timer set by the device for transmitting a heartbeat packet.

With reference to the first aspect, in a first implementation manner, the device further includes a receiving module and a sending module, where the determining module is further configured to learn at least one data packet and a socket of the at least one data packet that are transmitted by the device in a period of time corresponding to a current timing end moment of the timer. The determining module is further configured to determine, according to the socket of the at least one data packet, at least one candidate associated data packet corresponding to the current timing end moment in the at least one data packet, and the determining module is further configured to determine, according to the current timing end moment and a processing moment of the at least one candidate associated data packet corresponding to the current timing end moment, an associated data packet corresponding to the current timing end moment, where the associated data packet corresponding to the current timing end moment is a candidate associated data packet, having a minimum difference between a processing moment and the current timing end moment, of the candidate associated data packets corresponding to the current timing end moment, and the processing moment of the candidate associated data packet is a receiving moment for receiving the candidate associated data packet by the receiving module if the candidate associated data packet is a data packet received by the receiving module, or the processing moment of the candidate associated data packet is a sending moment for sending the candidate associated data packet by the sending module if the candidate associated data packet is a data packet sent by the sending module.

With reference to the first implementation manner of the second aspect, in a second implementation manner, the judging module is further configured to obtain, according to the current timing end moment and the processing moment of the associated data packet corresponding to the current timing end moment, a pheromone addition amount corresponding to the current timing end moment, determine a pheromone surplus amount according to the pheromone addition amount corresponding to the current timing end moment and each pheromone addition amount corresponding to each timing end moment before the current timing end moment, and determine, according to the pheromone surplus amount, whether the timer is the heartbeat packet timer set by the device for transmitting a heartbeat packet.

With reference to the second implementation manner of the second aspect, in a third implementation manner, the judging module is further configured to determine that the timer is the heartbeat packet timer if the pheromone surplus amount is greater than a first preset value, or the judging module is further configured to determine that the timer is not the heartbeat packet timer if the pheromone surplus amount is less than a second preset value, or if the pheromone surplus amount is less than the first preset value and is greater than the second preset value, and when a next timing end moment comes, the judging module is further configured to set the next timing end moment as a new current timing end moment, and return to perform the learning at least one data packet and a socket of the at least one data packet that are transmitted by the device in a period of time corresponding to a current timing end moment of the timer.

With reference to the third implementation manner of the second aspect, in a fourth implementation manner, a pheromone addition amount corresponding to any one of the timing end moments of the timer is determined according to:

$$add_i = \begin{cases} 1 - delta_i/\text{timeout}, & delta_i < \text{timeout} \\ -\text{THRESHOLD}/4, & delta_i \geq \text{timeout} \end{cases};$$

and the pheromone surplus amount surplus is determined according to:

$$\text{surplus} = \sum_{i=1}^{N} add_i + \text{extra}.$$

where both i and N are positive integers, a value of i is a sequence number of each timing end moment before the current timing end moment, and a value of N is a sequence number of the current timing end moment, $add_i$ is a pheromone addition amount corresponding to an $i^{th}$ timing end moment, $delta_i$ is an offset between the $i^{th}$ timing end moment and a processing moment of an associated data packet corresponding to the $i^{th}$ timing end moment, where $delta_i=|whenElapsed_i-netElapsed_i|$, $whenElapsed_i$ is the $i^{th}$ timing end moment, and $netElapsed_i$ is the processing moment of the associated data packet corresponding to the $i^{th}$ timing end moment, timeout is used to represent a maximum tolerable offset, extra is an estimated pheromone addition amount, THRESHOLD is the first preset value, and −THRESHOLD is the second preset value.

According to a third aspect, an embodiment of the present disclosure provides a device. The device sets a timer, and the device includes a processor configured to determine, in a data packet transmitted by the device, each associated data packet corresponding to each timing end moment of the timer, where an association relationship exists between the associated data packet and the timer, and the data packet transmitted by the device is a data packet sent by the device, or a data packet received by the device, or a data packet sent by the device and a data packet received by the device, where the processor is configured to determine, according to each associated data packet and each timing end moment of the timer, whether the timer is a heartbeat packet timer set by the device for transmitting a heartbeat packet.

With reference to the third aspect, in a first implementation manner, the device further includes a transmitter and a receiver, where the processor is further configured to learn at least one data packet and a socket of the at least one data packet that are transmitted by the device in a period of time corresponding to a current timing end moment of the timer. The processor is further configured to determine, according to the socket of the at least one data packet, at least one candidate associated data packet corresponding to the current timing end moment in the at least one data packet. The processor is further configured to determine, according to the current timing end moment and a processing moment of the at least one candidate associated data packet corresponding to the current timing end moment, an associated data packet corresponding to the current timing end moment, where the associated data packet corresponding to the current timing end moment is a candidate associated data packet, having a minimum difference between a processing moment and the current timing end moment, of the candidate associated data packets corresponding to the current timing end moment, and the processing moment of the candidate associated data packet is a receiving moment for receiving the candidate associated data packet by the receiver if the candidate associated data packet is a data packet received by the receiver, or the processing moment of the candidate associated data packet is a sending moment for sending the candidate associated data packet by the transmitter if the candidate associated data packet is a data packet sent by the transmitter.

With reference to the first implementation manner of the third aspect, in a second implementation manner, the processor is further configured to obtain, according to the current timing end moment and the processing moment of the associated data packet corresponding to the current timing end moment, a pheromone addition amount corresponding to the current timing end moment. The processor is further configured to determine a pheromone surplus amount according to the pheromone addition amount corresponding to the current timing end moment and each pheromone addition amount corresponding to each timing end moment before the current timing end moment. The processor is further configured to determine, according to the pheromone surplus amount, whether the timer is the heartbeat packet timer set by the device for transmitting a heartbeat packet.

With reference to the second implementation manner of the third aspect, in a third implementation manner, the processor is further configured to determine that the timer is the heartbeat packet timer if the pheromone surplus amount is greater than a first preset value, the processor is further configured to determine that the timer is not the heartbeat packet timer if the pheromone surplus amount is less than a second preset value, or if the pheromone surplus amount is less than the first preset value and is greater than the second preset value, and when a next timing end moment comes, the processor is further configured to set the next timing end moment as a new current timing end moment, and return to perform the learning at least one data packet and a socket of the at least one data packet that are transmitted by the device in a period of time corresponding to a current timing end moment of the timer.

With reference to the third implementation manner of the third aspect, in a fourth implementation manner, a pheromone addition amount corresponding to any one of the timing end moments of the timer is determined according to:

$$add_i = \begin{cases} 1 - delta_i/\text{timeout}, & delta_i < \text{timeout} \\ -\text{THRESHOLD}/4, & delta_i \geq \text{timeout} \end{cases};$$

and the pheromone surplus amount surplus is determined according to $$\text{surplus} = \sum_{i=1}^{N} add_i + \text{extra}.$$

where both i and N are positive integers, a value of i is a sequence number of each timing end moment before the current timing end moment, and a value of N is a sequence number of the current timing end moment, $add_i$ is a pheromone addition amount corresponding to an $i^{th}$ timing end moment, $delta_i$ is an offset between the $i^{th}$ timing end moment and a processing moment of an associated data packet corresponding to the $i^{th}$ timing end moment, where $delta_i=|whenElapsed_i-netElapsed_i|$, $whenElapsed_i$ is the $i^{th}$ timing end moment, and $netElapsed_i$ is the processing moment of the associated data packet corresponding to the $i^{th}$ timing end moment, timeout is used to represent a maximum tolerable offset, extra is an estimated pheromone addition amount, THRESHOLD is the first preset value, and −THRESHOLD is the second preset value.

According to the heartbeat packet timer identification method and the device provided in the embodiments of the present disclosure, the device sends a heartbeat packet, or the device sends and/or receives a data packet at a timing end moment of a heartbeat packet timer. With reference to all data packets sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
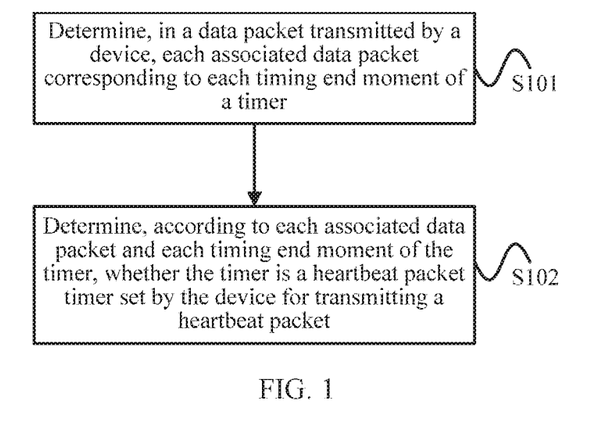
FIG. 1 is a schematic flowchart of Embodiment 1 of a heartbeat packet timer identification method according to the present disclosure.

FIG. 1 is a schematic flowchart of Embodiment 1 of a heartbeat packet timer identification method according to the present disclosure. As shown in FIG. 1, the identification method in this embodiment is performed by a device that sets a timer. The device may be a mobile terminal, a tablet computer, or a wearable wireless device. The identification method is as follows.

Step S101: Determine, in a data packet transmitted by the device, each associated data packet corresponding to each timing end moment of the timer.

The data packet transmitted by the device is a data packet sent by the device, a data packet received by the device, or a data packet sent by the device and a data packet received by the device.

The device sends a heartbeat packet at a timing end moment of a heartbeat packet timer. In this embodiment in order to accurately identify whether a timer is a heartbeat packet timer, whether the timer sends a heartbeat packet at each timing end moment needs to be learned. It may be understood that, each data packet sent and received by the device is sent and received for a process or an application running in the device. For example, a common application such as WECHAT or QQ running in a mobile terminal sends and receives a service data packet and a heartbeat packet using software and/or hardware in the device, and the device performs only a sending or receiving operation, and cannot directly learn whether the sent or received packet is a heartbeat packet. However, because the device starts to transmit a heartbeat packet to a peer end device (including sending a heartbeat packet to the peer end device and receiving a heartbeat packet fed back by the peer end device) from the timing end moment of the heartbeat packet timer, the timer may be a heartbeat packet timer only when the device transmits a data packet that may be a heartbeat packet to the peer end device from the timing end moment of the timer for multiple consecutive times. Therefore, in this embodiment, each timing end moment is combined with the data packet sent or received by the device in order to determine whether the timer is a heartbeat packet timer.

Considering that the device sends the heartbeat packet for a running process or a running application at the timing end moment of the heartbeat packet timer, optionally, the device may determine, in sent data packets, a data packet that may be the heartbeat packet. Alternatively, considering that the device receives the heartbeat packet fed back by the peer end device for a running process or a running application around the timing end moment of the heartbeat packet timer, optionally, the device may determine, in received data packets, a data packet that may be the heartbeat packet.

However, considering that running mechanisms of the foregoing applications or processes are different, in order to avoid a sending delay of the heartbeat packet, these applications or processes instruct, at a moment a little earlier than the timing end moment of the heartbeat timer, the device to send the data packet. Therefore, the device receives a heartbeat packet fed back by the peer end device when an objective time actually reaches the timing end moment of the heartbeat timer. Therefore in order to avoid not monitoring the data packet that may be a heartbeat packet, preferably, the device may further monitor all sent and received data packets, and determine, in all the data packets sent and received by the device, an associated data packet that may be a heartbeat packet. An association relationship exists between the associated data packet and the timer. Because a relatively large quantity of applications run in the device, it may be learned, according to information about each data packet sent and/or received by the device, for example, an Internet Protocol (IP) number and a port number in the data packet, that the data packet is sent or received for an application, and the timer is also set for the application. Therefore, it may be determined that the data packet and the timer are for the same application, and it is determined that an association relationship exists between the data packet and the timer. Further, considering that the heartbeat packet is sent or received around the timing end moment of the heartbeat packet timer, each associated data packet corresponding to each timing end moment of the timer is determined in all the data packets sent and/or received by the device.

Step S102: Determine, according to each associated data packet and each timing end moment of the timer, whether the timer is a heartbeat packet timer set by the device for transmitting a heartbeat packet.

Further, when the device determines that the device sends each associated data packet corresponding to each timing end moment at a timing end moment of each timer, and formats and sizes of the associated data packets are similar, it may be determined with relatively high accuracy that the timer is the heartbeat packet timer set by the device for transmitting a heartbeat packet.

Optionally, considering that a smaller time difference between a receiving moment or a sending moment of the associated data packet and the timing end moment corresponding to the associated data packet indicates a higher possibility that the associated data packet is a heartbeat packet, it may further be determined with relatively high accuracy, according to the time difference between the receiving moment or the sending moment of each associated data packet and each timing end moment, that the timer is the heartbeat packet timer set by the device for transmitting a heartbeat packet.

In this embodiment, a device sends a heartbeat packet, or the device sends and/or receives a data packet at a timing end moment of a heartbeat packet timer. With reference to all data packets sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

Figure 2:
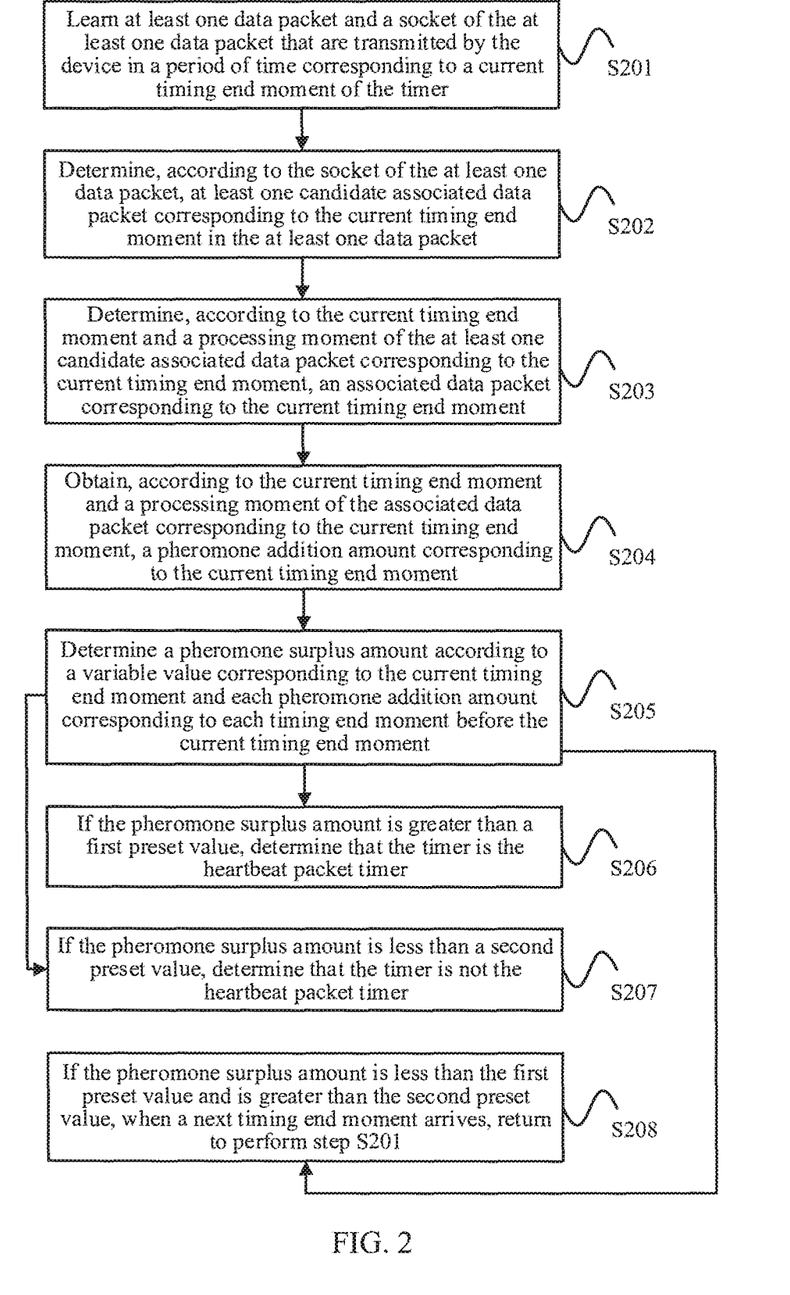
FIG. 2 is a schematic flowchart of Embodiment 2 of a heartbeat packet timer identification method according to the present disclosure.

FIG. 2 is a schematic flowchart of Embodiment 2 of a heartbeat packet timer identification method according to the present disclosure. As shown in FIG. 2, this embodiment gives further descriptions based on the embodiment shown in FIG. 1, and includes the following steps.

Step S201: Learn at least one data packet and a socket of the at least one data packet that are transmitted by the device in a period of time corresponding to a current timing end moment of the timer.

In the period of time corresponding to the current timing end moment, the device monitors at least one data packet sent or received by the device, and obtains a socket of the at least one data packet, and the socket of the data packet is used to describe an IP address and a port of the data packet.

The current timing end moment is a relative concept that changes as an objective time progresses. For example, if the objective time reaches a moment T1, and the moment T1 is a timing end moment of the timer, for the objective time reaching the moment T1, the moment T1 is the current timing end moment. If as the objective time progresses and reaches a moment T2, and the moment T2 is also a timing end moment of the timer, for the objective time reaching the moment T2, the moment T2 is a new current timing end moment.

Step S202: Determine, according to the socket of the at least one data packet, at least one candidate associated data packet corresponding to the current timing end moment in the at least one data packet.

In the period of time corresponding to the current timing end moment, at least one sent or received packet is monitored, and the socket of the at least one data packet is obtained. An application or a process for which the device separately sends or receives the at least one data packet may be determined according to the socket of the at least one data packet such that at least one data packet having an association relationship with the timer may be determined. Further, because the at least one data packet having the association relationship with the timer is received in the period of time corresponding to the current timing end moment, each of the at least one data packet having the association relationship with the timer is a candidate associated data packet corresponding to the current timing end moment.

Step S203: Determine, according to the current timing end moment and a processing moment of the at least one candidate associated data packet corresponding to the current timing end moment, an associated data packet corresponding to the current timing end moment.

In the candidate associated data packets determined in step S202, a processing moment of a candidate associated data packet is a receiving moment for receiving the candidate associated data packet by the device if the candidate associated data packet is a data packet received by the device, or a processing moment of the candidate associated data packet is a sending moment for sending a candidate associated data packet by the device if the candidate associated data packet is a data packet sent by the device.

The associated data packet corresponding to the current timing end moment is a candidate associated data packet, having a minimum difference between a processing moment and the timing end moment, of the candidate associated data packets corresponding to the current timing end moment. It may be understood that, a smaller time difference between the processing moment of the data packet and the timing end moment of the timer indicates a higher possibility that the data packet is a heartbeat packet that is sent by the device at the timing end moment of the timer, and accuracy of determining, with reference to the data packet, that the timer is the heartbeat packet timer is higher. Therefore, in this embodiment, it is determined, in the candidate associated data packet corresponding to the timing end moment, that the candidate associated data packet having the minimum difference between the processing moment and the timing end moment is the associated data packet corresponding to the timing end moment.

Step S204: Obtain, according to the current timing end moment and a processing moment of the associated data packet corresponding to the current timing end moment, a pheromone addition amount corresponding to the current timing end moment.

In this embodiment, a pheromone addition amount corresponding to any one of the timing end moments of the timer is determined according to:

$$add_i = \begin{cases} 1 - delta_i / \text{timeout}, & delta_i < \text{timeout} \\ -\text{THRESHOLD}/4, & delta_i \geq \text{timeout} \end{cases},$$

where both i and N are positive integers, a value of i is a sequence number of each timing end moment before the current timing end moment, and a value of N is a sequence number of the current timing end moment, $add_i$ is a pheromone addition amount corresponding to an $i^{th}$ timing end moment, $delta_i$ is an offset between the $i^{th}$ timing end moment and a processing moment of an associated data packet corresponding to the $i^{th}$ timing end moment, where $delta_i = |whenElapsed_i - netElapsed_i|$, $whenElapsed_i$ is the $i^{th}$ timing end moment, and $netElapsed_i$ is the processing moment of the associated data packet corresponding to the $i^{th}$ timing end moment, timeout is used to represent a maximum tolerable offset (a value may be flexibly set according to an actual requirement), THRESHOLD is the first preset value, and −THRESHOLD is the second preset value.

Further, $add_i$ is the pheromone addition amount corresponding to the $i^{th}$ timing end moment. A greater pheromone addition amount corresponding to the $i^{th}$ timing end moment indicates a higher possibility that the associated data packet corresponding to the $i^{th}$ timing end moment is a heartbeat packet. When $add_i$ is to be determined, considering that greater $delta_i$ indicates a lower possibility that the associated data packet corresponding to the $i^{th}$ timing end moment is the heartbeat packet, that is, a value of $delta_i$ is inversely proportional to a probability that the associated data packet corresponding to the $i^{th}$ timing end moment is the heartbeat packet, when $delta_i$ is less than timeout, 1−$delta_i$/timeout is used to determine the pheromone addition amount corresponding to the $i^{th}$ timing end moment. When $delta_i$ is greater than timeout, it may be determined that the associated data packet corresponding to the $i^{th}$ timing end moment is not the heartbeat packet. For loss of pheromone in step S205, −THRESHOLD/4 is used to determine the pheromone addition amount corresponding to the $i^{th}$ timing end moment.

Step S205: Determine a pheromone surplus amount according to a variable value corresponding to the current timing end moment and each pheromone addition amount corresponding to each timing end moment before the current timing end moment.

The pheromone surplus amount is determined according to:

$$\text{surplus} = \sum_{i=1}^{N} add_i + \text{extra},$$

where extra is an estimated pheromone addition amount, and a value of extra may be flexibly set according to an actual requirement.

Step S206: If the pheromone surplus amount is greater than a first preset value, determine that the timer is the heartbeat packet timer.

Step S207: If the pheromone surplus amount is less than a second preset value, determine that the timer is not the heartbeat packet timer.

Step S208: If the pheromone surplus amount is less than the first preset value and is greater than the second preset value, when a next timing end moment arrives, return to perform step S201.

Further, because the timer may be the heartbeat packet timer only when the device transmits the data packet that may be a heartbeat packet to the peer end device from the timing end moment of the timer for multiple consecutive times, the foregoing steps S201 to S208 need to be repeatedly performed in this embodiment. For example, if the objective time reaches the moment T1, and the moment T1 is a timing end moment of the timer, for the moment T1 in the objective time, the moment T1 is the current timing end moment of the timer, and step S201 to step S205 are performed. It may be understood that, for an objective time corresponding to each timing end moment that arrives before the moment T1, each timing end moment is also each current timing end moment. When step S201 to step S205 are performed from the moment T1, and it is determined that the pheromone surplus amount is greater than the first preset value or the pheromone surplus amount is less than the second preset value, it indicates that it can be determined, according to the current timing end moment and each associated data packet that corresponds to a moment before the current timing end moment, whether the timer is the heartbeat packet timer, and accuracy of a determining result is relatively high. However, when the pheromone surplus amount is less than the first preset value and is greater than the second preset value, it indicates that it cannot be determined with relatively high accuracy, according to the current timing end moment and each associated data packet that corresponds to a moment before the current timing end moment, whether the timer is the heartbeat packet timer. In other words, information (that is, each timing end moment and the processing moment of the associated data packet corresponding to each timing end moment) that is collected at a current moment, that is required, and that is used to determine, with relatively high accuracy, whether the timer is the heartbeat packet timer is not comprehensive and complete. Therefore, information that is required and that is used to determine, with high accuracy, whether the timer is the heartbeat packet timer needs to be further continuously collected. As the objective time progresses, when the moment T2 arrives, that is, when a next timing end moment arrives, the next timing end moment is used as a new current timing end moment, and return to perform step S201.

In addition, to reduce inconvenience of monitoring, by the device, the data packet received and/or sent by the device, the heartbeat packet is sent or received around each timing end moment, in this embodiment, all data packets that are received and/or sent by the device are monitored in a period of time corresponding to each timing end moment of the timer. The period of time corresponding to the timing end moment may a time point. Because one time point may be subdivided into infinitely many points in a differential domain, based on the fact that one time point includes infinitely many points, or because of a delay generated by data processing inside the device, the data packet that may be a heartbeat packet is missed during monitoring. The period of time corresponding to the timing end moment is a period of time having particular duration.

In this embodiment, a device sends a heartbeat packet, or the device sends and/or receives a data packet at a timing end moment of a heartbeat packet timer. With reference to all data packets sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

Figure 3:
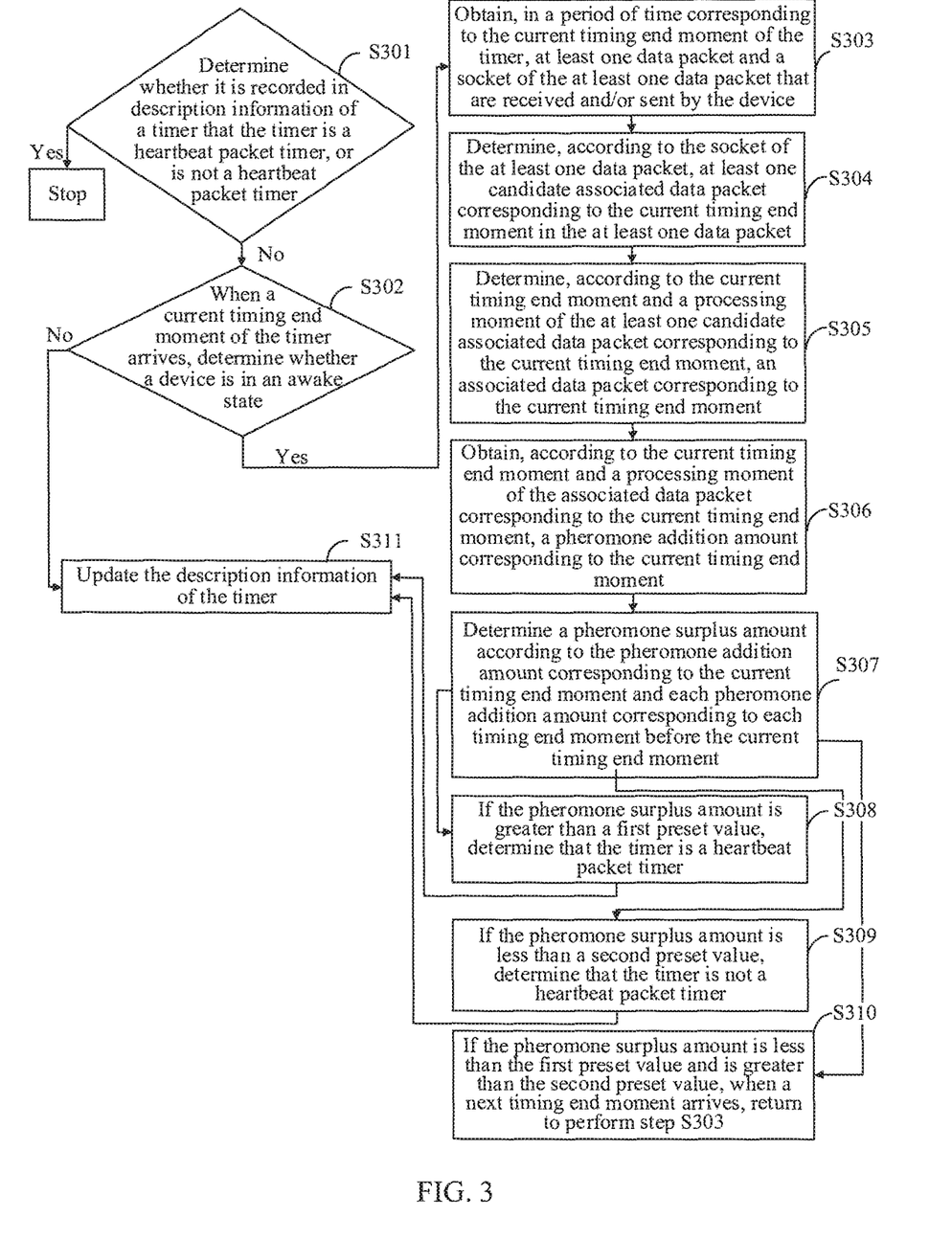
FIG. 3 is a schematic flowchart of Embodiment 3 of a heartbeat packet timer identification method according to the present disclosure.

FIG. 3 is a schematic flowchart of Embodiment 3 of a heartbeat packet timer identification method according to the present disclosure. As shown in FIG. 3, this embodiment describes a specific application process of the identification method with reference to the embodiment shown in FIG. 1 or FIG. 2, and the specific application process is as follows.

Step S301: Determine whether it is recorded in description information of a timer that the timer is a heartbeat packet timer, or is not a heartbeat packet timer, and if the timer is a heartbeat packet timer, the process stops, or if the timer is not a heartbeat packet timer, perform step S302.

Step S302: When a current timing end moment of the timer arrives, determine whether a device is in an awake state, and if the device is not in an awake state, perform step S311, or if the device is in an awake state, perform step S303 when a next timing end moment arrives.

When a timing end moment of the heartbeat packet timer arrives, if the device is in the awake state, the device directly sends a heartbeat packet. If the device is in a sleep state, when the timing end moment of the heartbeat packet timer arrives, the device is awakened in order to send a heartbeat packet. When a timing end moment of the timer arrives, a reason why the device is in the awake state may be that a timing end moment of the timer arrives, may be that the device is awakened by a heartbeat packet timer set by the device for another application or another process, or if the device is transmitting a service data packet, the device is in the awake state. However, if the device is in the sleep state, and when the timing end moment of the timer arrives, the device is still not awakened, it may be determined that the timer is not the heartbeat packet timer.

After it is determined that the timer is not the heartbeat packet timer, step S311 is performed. It is recorded in the description information of the timer that the timer is not the heartbeat packet timer. In a subsequent period of time, when the device needs to turn off the heartbeat packet timer or prolong timing duration of the heartbeat packet timer, the following steps do not need to be performed to identify the timer, and it may be directly determined that the timer is not the heartbeat packet timer.

Step S303: Obtain, in a period of time corresponding to the current timing end moment of the timer, at least one data packet and a socket of the at least one data packet that are received and/or sent by the device.

Step S304: Determine, according to the socket of the at least one data packet, at least one candidate associated data packet corresponding to the current timing end moment in the at least one data packet.

Step S305: Determine, according to the current timing end moment and a processing moment of the at least one candidate associated data packet corresponding to the current timing end moment, an associated data packet corresponding to the current timing end moment.

Step S306: Obtain, according to the current timing end moment and a processing moment of the associated data packet corresponding to the current timing end moment, a pheromone addition amount corresponding to the current timing end moment.

Step S307: Determine a pheromone surplus amount according to the pheromone addition amount corresponding to the current timing end moment and each pheromone addition amount corresponding to each timing end moment before the current timing end moment.

Step S308: If the pheromone surplus amount is greater than a first preset value, determine that the timer is a heartbeat packet timer.

Step S311 is performed after the step S308 is performed.

Step S309: If the pheromone surplus amount is less than a second preset value, determine that the timer is not a heartbeat packet timer.

Step S311 is performed after the step S309 is performed.

Step S310: If the pheromone surplus amount is less than the first preset value and is greater than the second preset value, when a next timing end moment arrives, return to perform step S303.

Step S311: Update the description information of the timer.

If step S311 is performed after step S308 is performed, the updated description information is that the timer is the heartbeat packet timer, or if step S311 is performed after step S302 or step S309 is performed, the updated description information is that the timer is not the heartbeat packet timer.

In this embodiment, a device sends a heartbeat packet, or the device sends or receives a data packet at a timing end moment of a heartbeat packet timer. With reference to the data packet sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

It should be noted that, the device may set at least one timer for multiple applications or processes. For any timer set by the device, the foregoing method embodiments may be used in order to determine whether the timer is the heartbeat packet timer.

Figure 4:
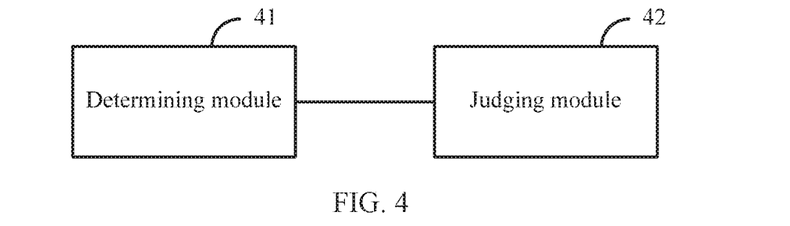
FIG. 4 is a schematic structural diagram of Embodiment 1 of a device according to the present disclosure.

FIG. 4 is a schematic structural diagram of Embodiment 1 of a device according to the present disclosure. As shown in FIG. 4, the device in this embodiment sets a timer, and includes a determining module 41 configured to determine, in a data packet transmitted by the device, each associated data packet corresponding to each timing end moment of the timer, where an association relationship exists between the associated data packet and the timer, and the data packet transmitted by the device is a data packet sent by the device, a data packet received by the device, or a data packet sent by the device and a data packet received by the device, and a judging module 42 configured to determine, according to each associated data packet and each timing end moment of the timer, whether the timer is a heartbeat packet timer set by the device for transmitting a heartbeat packet.

In this embodiment, a device sends a heartbeat packet, or the device sends or receives a data packet at a timing end moment of a heartbeat packet timer. With reference to the data packet sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

Figure 5:
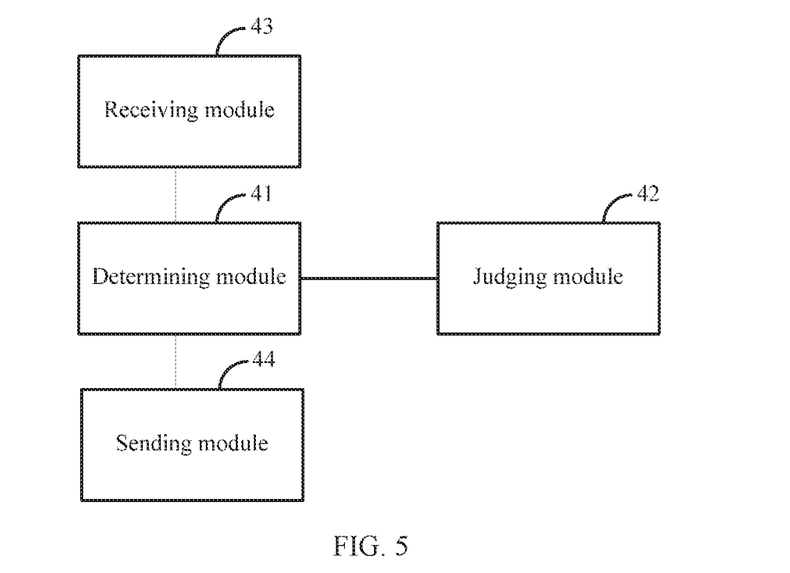
FIG. 5 is a schematic structural diagram of Embodiment 2 of a device according to the present disclosure.

FIG. 5 is a schematic structural diagram of Embodiment 2 of a device according to the present disclosure. As shown in FIG. 5, this embodiment gives further descriptions based on the embodiment shown in FIG. 4. Further, the device includes a receiving module 43 and a sending module 44, the receiving module 43 is configured to receive a data packet, and the sending module 44 is configured to send a data packet, where the determining module 41 is further configured to learn at least one data packet and a socket of the at least one data packet that are transmitted by the device in a period of time corresponding to a current timing end moment of the timer. The determining module 41 is further configured to determine, according to the socket of the at least one data packet, at least one candidate associated data packet corresponding to the current timing end moment in the at least one data packet, and the determining module 41 is further configured to determine, according to the current timing end moment and a processing moment of the at least one candidate associated data packet corresponding to the current timing end moment, an associated data packet corresponding to the current timing end moment, where the associated data packet corresponding to the current timing end moment is a candidate associated data packet, having a minimum difference between a processing moment and the current timing end moment, of the candidate associated data packets corresponding to the current timing end moment, and the processing moment of the candidate associated data packet is a receiving moment for receiving the candidate associated data packet by the receiving module 43 if the candidate associated data packet is a data packet received by the device, or the processing moment of the candidate associated data packet is a sending moment for sending the candidate associated data packet by the sending module 44 if the candidate associated data packet is a data packet sent by the device.

The judging module 42 is further configured to obtain, according to the current timing end moment and the processing moment of the associated data packet corresponding to the current timing end moment, a pheromone addition amount corresponding to the current timing end moment, determine a pheromone surplus amount according to the pheromone addition amount corresponding to the current timing end moment and each pheromone addition amount corresponding to each timing end moment before the current timing end moment, and determine, according to the pheromone surplus amount, whether the timer is the heartbeat packet timer set by the device for transmitting a heartbeat packet.

The judging module 42 is further configured to determine that the timer is the heartbeat packet timer if the pheromone surplus amount is greater than a first preset value, or the judging module 42 is further configured to determine that the timer is not the heartbeat packet timer if the pheromone surplus amount is less than a second preset value, or if the pheromone surplus amount is less than the first preset value and is greater than the second preset value, when a next timing end moment comes, the judging module 42 is further configured to set the next timing end moment as a new current timing end moment, and return to perform the learning at least one data packet and a socket of the at least one data packet that are transmitted by the device in a period of time corresponding to a current timing end moment of the timer. A pheromone addition amount corresponding to any one of the timing end moments of the timer is determined according to:

$$add_i = \begin{cases} 1 - delta_i / timeout, & delta_i < timeout \\ -THRESHOLD/4, & delta_i \geq timeout \end{cases};$$

and the pheromone surplus amount Surplus is determined according to $$surplus = \sum_{i=1}^{N} add_i + extra.$$

where both i and N are positive integers, a value of i is a sequence number of each timing end moment before the current timing end moment, and a value of N is a sequence number of the current timing end moment, $add_i$ is a pheromone addition amount corresponding to an $i^{th}$ timing end moment, $delta_i$ is an offset between the $i^{th}$ timing end moment and a processing moment of an associated data packet corresponding to the $i^{th}$ timing end moment, where $delta_i = |whenElapsed_i - netElapsed_i|$, $whenElapsed_i$ is the $i^{th}$ timing end moment, and $netElapsed_i$ is the processing moment of the associated data packet corresponding to the $i^{th}$ timing end moment, timeout is used to represent a maximum tolerable offset, extra is an estimated pheromone addition amount, THRESHOLD is the first preset value, and −THRESHOLD is the second preset value.

In this embodiment, a device sends a heartbeat packet, or the device sends or receives a data packet at a timing end moment of a heartbeat packet timer. With reference to the data packet sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

Figure 6:
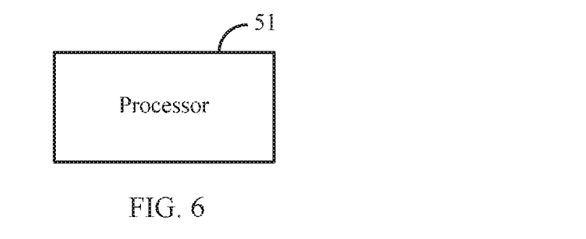
FIG. 6 is a schematic structural diagram of Embodiment 3 of a device according to the present disclosure.

FIG. 6 is a schematic structural diagram of Embodiment 3 of a device according to the present disclosure. As shown in FIG. 6, the device in this embodiment sets a timer, and the device includes a processor 51 configured to determine, in a data packet transmitted by the device, each associated data packet corresponding to each timing end moment of the timer, where an association relationship exists between the associated data packet and the timer, and the data packet transmitted by the device is a data packet sent by the device, a data packet received by the device, or a data packet sent by the device and a data packet received by the device, where the processor 51 is configured to determine, according to each associated data packet and each timing end moment of the timer, whether the timer is a heartbeat packet timer set by the device for transmitting a heartbeat packet.

In this embodiment, a device sends a heartbeat packet, or the device sends or receives a data packet at a timing end moment of a heartbeat packet timer, with reference to the data packet sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

It should be noted that, the modules in the foregoing device embodiments are used to perform the corresponding steps in the foregoing method embodiments. For specific implementation processes and beneficial effects, refer to the foregoing method embodiments.

Figure 7:
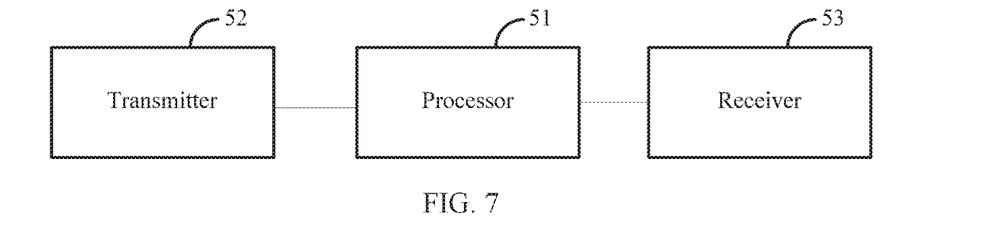
FIG. 7 is a schematic structural diagram of Embodiment 4 of a device according to the present disclosure.

FIG. 7 is a schematic structural diagram of Embodiment 4 of a device according to the present disclosure. As shown in FIG. 7, this embodiment gives further descriptions based on the embodiment shown in FIG. 6. In this embodiment, the device further includes a transmitter 52 and a receiver 53, the transmitter 52 is configured to send a data packet, and the receiver 53 is configured to receive a data packet, where the processor 51 is further configured to learn at least one data packet and a socket of the at least one data packet that are transmitted by the device in a period of time corresponding to a current timing end moment of the timer. The processor 51 is further configured to determine, according to the socket of the at least one data packet, at least one candidate associated data packet corresponding to the current timing end moment in the at least one data packet. The processor 51 is further configured to determine, according to the current timing end moment and a processing moment of the at least one candidate associated data packet corresponding to the current timing end moment, an associated data packet corresponding to the current timing end moment, where the associated data packet corresponding to the current timing end moment is a candidate associated data packet, having a minimum difference between a processing moment and the current timing end moment, of the candidate associated data packets corresponding to the current timing end moment, and the processing moment of the candidate associated data packet is a receiving moment for receiving the candidate associated data packet by the receiver 53 if the candidate associated data packet is a data packet received by the receiver 53, or the processing moment of the candidate associated data packet is a sending moment for sending the candidate associated data packet by the transmitter 52 if the candidate associated data packet is a data packet sent by the transmitter 52.

The processor 51 is further configured to obtain, according to the current timing end moment and the processing moment of the associated data packet corresponding to the current timing end moment, a pheromone addition amount corresponding to the current timing end moment. The processor 51 is further configured to determine a pheromone surplus amount according to the pheromone addition amount corresponding to the current timing end moment and each pheromone addition amount corresponding to each timing end moment before the current timing end moment, and the processor 51 is further configured to determine, according to the pheromone surplus amount, whether the timer is the heartbeat packet timer set by the device for transmitting a heartbeat packet.

The processor 51 is further configured to determine that the timer is the heartbeat packet timer if the pheromone surplus amount is greater than a first preset value, or the processor 51 is further configured to determine that the timer is not the heartbeat packet timer if the pheromone surplus amount is less than a second preset value, or if the pheromone surplus amount is less than the first preset value and is greater than the second preset value, and when a next timing end moment comes, the processor 51 is further configured to set the next timing end moment as a new current timing end moment, and return to perform the learning at least one data packet and a socket of the at least one data packet that are transmitted by the device in a period of time corresponding to a current timing end moment of the timer. Further, a pheromone addition amount corresponding to any one of the timing end moments of the timer is determined according to:

$$add_i = \begin{cases} 1 - delta_i/\text{timeout}, & delta_i < \text{timeout} \\ -\text{THRESHOLD}/4, & delta_i \geq \text{timeout} \end{cases};$$

and the pheromone surplus amount surplus is determined according to $$\text{surplus} = \sum_{i=1}^{N} add_i + \text{extra}.$$

where both i and N are positive integers, a value of i is a sequence number of each timing end moment before the current timing end moment, and a value of N is a sequence number of the current timing end moment, $add_i$ is a pheromone addition amount corresponding to an $i^{th}$ timing end moment, $delta_i$ is an offset between the $i^{th}$ timing end moment and a processing moment of an associated data packet corresponding to the $i^{th}$ timing end moment, where $delta_i = |\text{whenElapsed}_i - \text{netElapsed}_i|$, $\text{whenElapsed}_i$ is the $i^{th}$ timing end moment, and $\text{netElapsed}_i$ is the processing moment of the associated data packet corresponding to the $i^{th}$ timing end moment, timeout is used to represent a maximum tolerable offset, extra is an estimated pheromone addition amount, THRESHOLD is the first preset value, and −THRESHOLD is the second preset value.

In this embodiment, a device sends a heartbeat packet, or the device sends or receives a data packet at a timing end moment of a heartbeat packet timer. With reference to the data packet sent and/or received by the device and each associated data packet that corresponds to each timing end moment of a timer, whether the timer is a heartbeat packet timer may be determined with relatively high accuracy. The heartbeat packet timer can be accurately turned off or timing duration of the heartbeat packet timer can be prolonged when the device does not need to be frequently awakened in order to reduce power consumption of the device, and avoid, with a relatively high possibility, a case in which other performance of the device is affected because of incorrect determining performed on the timer.

It should be noted that, the components, for example, a processor, a transmitter, and a receiver, in the foregoing device embodiments are used to perform the corresponding steps in the foregoing method embodiments. For specific implementation processes and beneficial effects, refer to the foregoing method embodiments.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A heartbeat packet timer identification method, comprising:
    setting a plurality of timers by a device;
    determining, in a data packet processed by the device, associated data packets corresponding to timing end moments of the plurality of timers, wherein an association relationship exists between each associated data packet and one of the plurality of timers, and wherein the data packet processed by the device is a data packet sent by the device, a data packet received by the device, or a data packet sent by the device and a data packet received by the device; and identifying, according to each associated data packet and each timing end moment, one of the plurality of timers as being a heartbeat packet timer set by the device for transmitting a heartbeat packet, wherein determining the associated data packets corresponding to the timing end moments of the plurality of timers comprises:

learning at least one data packet and a socket of the at least one data packet transmitted by the device in a period a time corresponding to a current timing end moment of the timer;

determining, according to the socket of the at least one data packet, at least one candidate associated data packet corresponding the current timing end moment in the at least one data packet; and determining, according to the current timing end moment and a processing moment of the at least one candidate associated data packet corresponding to the current timing end moment, an associated data packet corresponding to the current timing end moment, wherein the associated data packet corresponding to the current timing end moment is a candidate associated data packet, having a minimum difference between a processing moment and the current timing end moment, of candidate associated data packets corresponding to the current timing end moment, wherein the processing moment of the candidate associated data packet is a receiving moment for receiving, the candidate associated data packet by the device when the candidate associated data packet is a data packet received by the device, and wherein the processing moment of the candidate associated data packet is a sending moment for sending the candidate associated data packet bathe device when the candidate associated data packet is a data packet sent by the device.

2. The heartbeat packet timer identification method of claim 1, wherein identifying, according to each associated data packet and each timing end moment, one of the plurality of timers as being the heartbeat packet timer set by the device for transmitting the heartbeat packet comprises:

obtaining, according to the current timing end moment and the processing moment of the associated data packet corresponding to the current timing end moment, a pheromone addition amount corresponding to the current timing end moment;

determining a pheromone surplus amount according to the pheromone addition amount corresponding to the current timing end moment and each pheromone addition amount corresponding to each timing end moment before the current timing end moment; and determining, according to the pheromone surplus amount, whether a timer in the plurality of timers is the heartbeat packet timer set by the device for transmitting the heartbeat packet.

3. The heartbeat packet timer identification method of claim 2, wherein determining, according to the pheromone surplus amount, whether the tinier is the heartbeat packet timer set by the device for transmitting the heartbeat packet comprises:

determining that the timer is the heartbeat packet timer when the pheromone surplus amount is greater than a first preset value;

determining that the timer is not the heartbeat packet timer when the pheromone surplus amount is less than a second preset value; and setting a next timing end moment as a new current timing end moment, and returning to perform learning the at least one data packet and the socket of the at least one data packet transmitted by the device in the period of time corresponding to the current timing end moment of the timer when the pheromone surplus amount is less than the first preset value and is greater than the second preset value, and when the next timing end moment comes.

4. The heartbeat packet timer identification method of claim 3, wherein a pheromone addition amount corresponding to any one of the timing end moments of the timer is determined according to $$add_i = \begin{cases} 1 - delta_i / \text{timeout}, & delta_i < \text{timeout} \\ -\text{THRESHOLD}/4, & delta_i \geq \text{timeout} \end{cases}$$

wherein the pheromone surplus amount (surplus) is determined according to $$\text{surplus} = \sum_{i=1}^{N} add_i + \text{extra},$$

wherein both i and N are positive integers, wherein a value of i is a sequence number of each timing end moment before the current timing end moment, wherein a value of N is a sequence number of the current timing end moment, wherein $add_i$ is a pheromone addition amount corresponding to an $i^{th}$ timing end moment, wherein $delta_i$ is an offset between the $i^{th}$ timing end moment and a processing moment of an associated data packet corresponding to the $i^{th}$ timing end moment, wherein $delta_i = |whenElapse\ d_i - netElapsed_i|$, wherein $whenElapsed_i$ is the $i^{th}$ timing end moment, wherein $netElapsed_i$ is the processing moment of the associated data packet corresponding to the $i^{th}$ timing end moment, wherein timeout represents a maximum tolerable offset, wherein extra is an estimated pheromone addition amount, wherein THRESHOLD is the first preset value, and wherein −THRESHOLD is the second preset value.

5. The heartbeat packet timer identification method of claim 1, wherein each of the plurality of timers is associated with a different application running on the device.

6. The heartbeat packet timer identification method of claim 1, further comprising turning off the one of the plurality of timers to reduce power consumption of the device.

7. The heartbeat packet timer identification method of claim 1, further comprising prolonging an interval between heartbeats of the one of the plurality of timers to reduce power consumption of the device.

8. A device comprising:
a receiver;
a transmitter;
a memory comprising instructions; and
a processor coupled to the receiver, the transmitter, and the memory, wherein the instructions cause the processor to be configured to:
set a plurality of timers by the device;
determine, in a data packet processed by the device, associated data packets corresponding to timing end moments of the plurality of timers, wherein an association relationship exists between each associated data packet and one of the plurality of timers, and wherein the data packet processed by the device is a data packet sent by the device, a data packet received by the device, or a data packet sent by the device and a data packet received by the device;

identify, according to each associated data packet and each timing end moment, one of the plurality of timers as being a heartbeat packet timer set by the device for transmitting a heartbeat packet;

learn at least one data packet and a socket of the at least one data packet transmitted by the device in a period of time corresponding to a current timing end moment of the timer;

determine, according to the socket of the at least one data packet, at least one candidate associated data packet corresponding to the current timing end moment in the at least one data packet; and determine, according to the current timing end moment and processing moment of the at least one candidate associated data packet corresponding to the current timing end moment, an associated data packet corresponding to the current timing end moment, wherein the associated data packet corresponding to the current timing end moment is a candidate associated data packet, having a minimum difference between a processing moment and the current timing end moment, of candidate associated data packets corresponding to the current timing end moment, wherein the processing moment of the candidate associated data packet is a receiving moment for receiving the candidate associated data packet by the receiver when the candidate associated data packet is a data packet received by the receiver, and wherein the processing moment of the candidate associated data packet is a sending moment for sending the candidate associated data packet by the transmitter when the candidate associated data packet is a data packet sent by the transmitter.

9. The device of claim 8, wherein the instructions further cause the processor to be configured to:

obtain, according to the current timing end moment and the processing moment of the associated data packet corresponding to the current timing end moment, a pheromone addition amount corresponding to the current timing end moment;

determine a pheromone surplus amount according to the pheromone addition amount corresponding to the current timing end moment and each pheromone addition amount corresponding to each timing end moment before the current timing end moment; and determine, according to the pheromone surplus amount, whether a timer in the plurality of timers is the heartbeat packet timer set by the device for transmitting the heartbeat packet.

10. The device of claim 9, wherein the instructions further cause the processor to be configured to:

determine that the timer is the heartbeat packet timer when the pheromone surplus amount is greater than a first preset value;

determine that the timer is not the heartbeat packet timer when the pheromone surplus amount is less than a second preset value; and set a next timing end moment as a new current timing end moment, and return to perform learning the at least one data packet and the socket of the at least one data packet transmitted by the device in the period of time corresponding to the current timing end moment of the timer when the pheromone surplus amount is less than the first preset value and is greater than the second preset value, and when the next timing end moment comes.

11. The device of claim 10, wherein a pheromone addition amount corresponding to any one of the timing end moments of the timer is determined according to $$add_i = \begin{cases} 1 - delta_i/\text{timeout}, & delta_i < \text{timeout} \\ -\text{THRESHOLD}/4, & delta_i \geq \text{timeout} \end{cases}$$

wherein the pheromone surplus amount (surplus) is determined according to $$\text{surplus} = \sum_{i=1}^{N} add_i + \text{extra},$$

wherein both i and N are positive integers, wherein a value of i is a sequence number of each timing end moment before the current timing end moment, wherein a value of N is a sequence number of the current timing end moment, wherein $add_i$ is a pheromone addition amount corresponding to an $i^{th}$ timing end moment, wherein $delta_i$ is an offset between the $i^{th}$ timing end moment and a processing moment of an associated data packet corresponding to the $i^{th}$ timing end moment, wherein $delta_i=|\text{whenElapse } d_i-\text{netElapsed }_i|$, wherein whenElapsed is the $i^{th}$ timing end moment, wherein $netElapsed_i$ is the processing moment of the associated data packet corresponding to the $i^{th}$ timing end moment, wherein timeout represents a maximum tolerable offset, wherein extra is an estimated pheromone addition amount, wherein THRESHOLD is the first preset value, and wherein -THRESHOLD is the second preset value.

12. The device of claim 8, wherein each of the plurality of timers is associated with a different application running on the device.

13. The device of claim 8, wherein the one of the plurality of timers is turned off to reduce power consumption of the device.

14. The device of claim 8, wherein an interval between heartbeats of the one of the plurality of timers is prolonged to reduce power consumption of the device.

15. A device comprising:
a transmitter;
a receiver;
a memory comprising instructions; and
a processor coupled to the transmitter, the receiver, and the memory, wherein the instructions cause the processor to be configured to:

determine, in a data packet processed by the device, each associated data packet corresponding to each timing end moment of a timer, wherein an association relationship exists between the associated data packet and the timer, and wherein the data packet processed by the device is a data packet sent by the device, a data packet received by the device, or a data packet sent by the device and a data packet received by the device; and determine, according to each associated data packet, each timing end moment of the timer, and a pheromone surplus amount, whether the tinier is a heartbeat packet timer set by the device for transmitting a heartbeat packet, wherein the timer is determined as the heartbeat packet timer when the pheromone surplus amount is greater than a first preset value, and wherein the timer is determined to not be the heartbeat timer packet when the pheromone surplus amount is less than a second preset value;

learn at least one data packet and a socket of the at least one data packet transmitted by the device in a period of time corresponding to a current timing end moment of the timer;

determine, according to the socket of the at least one data packet, at least one candidate associated data packet corresponding to the current timing end moment in the at least one data packet; and determine, according to the current timing end moment and a processing moment of the at least one candidate associated data packet corresponding to the current end moment, an associated data packet corresponding to the current timing end moment, wherein the associated data packet corresponding to the current timing end moment is a candidate associated data packet, having a minimum difference between a processing moment and the current timing end moment, of candidate associated data packets corresponding to the current timing end moment, wherein the processing moment of the candidate associated data packet is a receiving moment for receiving the candidate associated data packet by the receiver when the candidate associated data packet is a data packet received by the receiver, and wherein the processing moment of the candidate associated data packet is a sending moment for sending the candidate associated data packet by the transmitter when the candidate associated data packet is a data packet sent by the transmitter.

16. The device of claim 15, wherein the instructions further cause the processor to be configured to:

obtain, according to the current timing end moment and the processing moment of the associated data packet corresponding to the current timing end moment, a pheromone addition amount corresponding to the current timing end moment;

determine a pheromone surplus amount according to the pheromone addition amount corresponding to the current timing end moment and each pheromone addition amount corresponding to each timing end moment before the current timing end moment; and determine, according to the pheromone surplus amount, whether the timer is the heartbeat packet timer set by the device for transmitting the heartbeat packet.

17. The device of claim 16, wherein the instructions further cause the processor to be configured to:

set a next timing end moment as a new current timing end moment; and return to perform learning the at least one data packet and the socket of the at least one data packet transmitted by the device in the period of time corresponding to the current timing end moment of the timer when the pheromone surplus amount is less than the first preset value and is greater than the second preset value, and when the next timing end moment comes.

18. The device of claim 17, wherein a pheromone addition amount corresponding to any one of the timing end moments of the timer is determined according to $$add_i = \begin{cases} 1 - delta_i/\text{timeout}, & delta_i < \text{timeout} \\ -\text{THRESHOLD}/4, & delta_i \geq \text{timeout} \end{cases}$$

wherein the pheromone surplus amount (surplus) is determined according to $$\text{surplus} = \sum_{i=1}^{N} add_i + \text{extra},$$

wherein both i and N are positive integers, wherein a value of i is a sequence number of each timing end moment before the current timing end moment, wherein a value of N is a sequence number of the current timing end moment, wherein $add_i$ is a pheromone addition amount corresponding to an $i^{th}$ timing end moment, wherein $delta_i$ is an offset between the timing end moment and a processing moment of an associated data packet corresponding to the $i^{th}$ timing end moment, wherein $delta_i=|\text{whenElapse } d_i-\text{netElapsed}_i|$, wherein whenElapsed is the $i^{th}$ timing end moment, wherein $netElapsed_i$ is the processing moment of the associated data packet corresponding to the $i^{th}$ timing end moment, wherein timeout represents a maximum tolerable offset, wherein extra is an estimated pheromone addition amount, wherein THRESHOLD is the first preset value, and wherein -THRESHOLD is the second preset value.

19. The device of claim 15, wherein an interval between heartbeats of the one of the plurality of timers is prolonged or the one of the plurality of timers is turned off to reduce power consumption of the device.

* * * * *

UNITED STATES PATENT AND TRADEMARK OFFICE
CERTIFICATE OF CORRECTION

PATENT NO. : 10,673,726 B2  
APPLICATION NO. : 15/532422  
DATED : June 2, 2020  
INVENTOR(S) : Yu Peng et al.

Page 1 of 2

It is certified that error appears in the above-identified patent and that said Letters Patent is hereby corrected as shown below:

In the Claims

Claim 1, Column 19, Line 33: "moment for receiving," should read "moment for receiving"

Claim 1, Column 19, Line 38: "packet bathe device" should read "packet by the device"

Claim 4, Column 20, Line 35: "wherein add, is a" should read "wherein $add_i$ is"

Claim 4, Column 20, Line 36: "wherein delta, is an offset" should read "wherein $delta_i$ is an offset"

Claim 4, Column 20, Line 40 and 41: "wherein whenElapsed, is the $i^{th}$ timing end moment, wherein netElapsed, is the" should read "wherein $whenElapsed_i$ is the $i^{th}$ timing end moment, wherein $netElapsed_i$ is the"

Claim 11, Column 22, Line 28: "wherein add, is a" should read "wherein $add_i$ is"

Claim 11, Column 22, Line 29: "wherein delta, is an offset" should read "wherein $delta_i$ is an offset"

Claim 11, Column 22, Line 33 and 34: "wherein whenElapsed, is the $i^{th}$ timing end moment, wherein netElapsed, is the" should read "wherein $whenElapsed_i$ is the $i^{th}$ timing end moment, wherein $netElapsed_i$ is the"

Claim 15, Column 22, Line 67: "whether the tinier is a" should read "whether the timer is a"

Claim 15, Column 23, Line 2: "wherein the tinier is determined" should read "wherein the timer is determined"

Claim 15, Column 23, Line 19: "current end moment," should read "current timing end moment,"

Signed and Sealed this  
Twenty-eighth Day of July, 2020

Andrei Iancu  
*Director of the United States Patent and Trademark Office*

CERTIFICATE OF CORRECTION (continued)
U.S. Pat. No. 10,673,726 B2

Claim 18, Column 24, Line 34: "wherein add, is a" should read "wherein $add_i$ is"

Claim 18, Column 24, Line 35: "wherein delta, is an offset" should read "wherein $delta_i$ is an offset"